(12) United States Patent
Ahn

(10) Patent No.: US 9,412,546 B2
(45) Date of Patent: Aug. 9, 2016

(54) CONTROL UNIT FOR CIRCUIT BREAKER AND CONTROLLING METHOD THEREOF

(71) Applicant: LSIS CO., LTD., Anyang-si, Gyeonggi-do (KR)

(72) Inventor: Hong Seon Ahn, Cheongju-si (KR)

(73) Assignee: LSIS CO., LTD., Anyang-si (KR)

(*) Notice: Subject to any disclaimer, the term of this patent is extended or adjusted under 35 U.S.C. 154(b) by 143 days.

(21) Appl. No.: 14/275,659

(22) Filed: May 12, 2014

(65) Prior Publication Data
US 2014/0355165 A1 Dec. 4, 2014

(30) Foreign Application Priority Data
Jun. 4, 2013 (KR) .......................... 10-2013-0064216

(51) Int. Cl.
*H01H 51/00* (2006.01)
*H02H 7/26* (2006.01)
*H02H 1/00* (2006.01)

(52) U.S. Cl.
CPC .............. *H01H 51/00* (2013.01); *H02H 1/0061* (2013.01); *H02H 7/261* (2013.01)

(58) Field of Classification Search
CPC ...... H01H 51/00; H02H 1/0061; H02H 7/261
USPC .......................................................... 361/152
See application file for complete search history.

(56) References Cited

U.S. PATENT DOCUMENTS 4,530,024 A * 7/1985 Brady, Jr. ................. H02H 7/22
361/63

(Continued)

FOREIGN PATENT DOCUMENTS

| CN | 1300456 | 6/2001 |
| CN | 102496901 | 6/2012 |
| WO | 00/48281 | 8/2000 |

OTHER PUBLICATIONS

European Patent Office Application Serial No. 14168267.4, Search Report dated Dec. 1, 2014, 6 pages.

(Continued)

*Primary Examiner* — Thienvu Tran
*Assistant Examiner* — Kevin J Comber
(74) *Attorney, Agent, or Firm* — Lee, Hong, Degerman, Kang & Waimey PC; Jonathan Kang; Justin Lee

(57) ABSTRACT

Disclosed are a control unit for a circuit breaker capable of controlling and monitoring various types of switches such as a circuit breaker and a switchgear included in power system equipment, by being attached to the switches or by being implemented in the form of an independent module, and a controlling method thereof. The control unit for a circuit breaker, which interworks with a relay and a circuit breaker, includes: an Ethernet drive configured to receive a GOOSE message type control signal from the relay connected thereto through Ethernet communication; a control module configured to operate the circuit breaker based on the GOOSE message type control signal; and a main control unit (MCU) module configured to transmit the GOOSE message type control signal to the control module, if the received GOOSE message type control signal is related to the control unit.

4 Claims, 3 Drawing Sheets

(56) References Cited

U.S. PATENT DOCUMENTS

| | | | |
|---|---|---|---|
| 6,469,629 B1* | 10/2002 | Campbell | H02H 1/0061 340/635 |
| 2011/0069718 A1 | 3/2011 | Morris et al. | |
| 2012/0057266 A1 | 3/2012 | Kasztenny | |
| 2012/0265360 A1 | 10/2012 | Smit | |
| 2013/0051215 A1 | 2/2013 | Kim | |
| 2014/0074415 A1* | 3/2014 | Rudolph | G01R 21/133 702/60 |

OTHER PUBLICATIONS

The State Intellectual Property Office of the People's Republic of China Application Serial No. 201410246019.4, Office Action dated Nov. 24, 2015, 6 pages.

* cited by examiner

CONTROL UNIT FOR CIRCUIT BREAKER AND CONTROLLING METHOD THEREOF

CROSS-REFERENCE TO RELATED APPLICATION

Pursuant to 35 U.S.C. §119(a), this application claims the benefit of earlier filing date and right of priority to Korean Application No. 10-2013-0064216, filed on Jun. 4, 2013, the contents of which are all hereby incorporated by reference herein in its entirety.

BACKGROUND OF THE DISCLOSURE

1. Field of the Disclosure

The present disclosure relates to a control unit for a circuit breaker and a controlling method thereof, and particularly, to a control unit for a circuit breaker, capable of controlling and monitoring various types of switches such as a circuit breaker and a switchgear included in power system equipment, by being formed as a module detachable to the switches, or by being formed as an independent module spaced from the switches, and a controlling method thereof.

2. Background of the Disclosure

Generally, as shown in FIG. 1, a power system is composed of a circuit breaker to be controlled, and an Intelligent Electronic Device (IED) or a relay (hereinafter, will be referred to as a 'relay') for controlling the circuit breaker. The circuit breaker and the relay are installed as a pair.

As shown in FIG. 2, a power device configured to supply a current to a magnetization coil for operating the circuit breaker, and a contact signal line configured to connect the relay to the circuit breaker, are connected between the relay and the circuit breaker.

A length of the contact signal line may be within the range of several meters (m)~several hundred meters. In a case where two relays are installed at two circuit breakers, the circuit breakers are connected to the relays by two contact signal lines. In this case, the two contact signal lines are individually formed.

In a case where the relay and the circuit breaker are installed at different buildings, the contact signal line should be buried between the buildings. In this case, the contact signal line may be grounded due to lightning and its inferior coating. This may cause a difficulty in controlling the circuit breaker with reliability.

Further, one relay can control one or two circuit breakers due to its limited capacity of a contract for control command. If a single line using a DC voltage is installed with a long length, it is difficult to obtain reliability of a signal due to a stray voltage, etc.

SUMMARY OF THE DISCLOSURE

Therefore, an aspect of the detailed description is to provide a control unit for a circuit breaker, capable of minimizing usage of a contact signal line, through signal transmission/reception between an Relay and a control unit, by using GOOSE communication protocols of IEC 61850-based substation automation, and a controlling method thereof.

Another aspect of the detailed description is to provide a control unit for a circuit breaker, capable of controlling a plurality of circuit breakers by one Relay, or controlling a specific circuit breaker by a plurality of Relays, and a controlling method thereof.

To achieve these and other advantages and in accordance with the purpose of this specification, as embodied and broadly described herein, there is provided a control unit for a circuit breaker, which interworks with a relay and a circuit breaker, the control unit comprising: an Ethernet drive configured to receive a GOOSE message type control signal from the relay connected thereto through Ethernet communication; a control module configured to operate the circuit breaker based on the GOOSE message type control signal; and a main control unit (MCU) module configured to transmit the GOOSE message type control signal to the control module, if the received GOOSE message type control signal is related to the control unit.

In an embodiment of the present invention, the GOOSE message type control signal may include a control command, a status of a contact point, quality information and timestamp information.

In an embodiment of the present invention, the relay may be configured to broadcast the GOOSE message type control signal to one or more control units connected thereto through Ethernet communication.

In an embodiment of the present invention, the Ethernet communication may be optical (FX) communication or twisted fair (TX) communication.

In an embodiment of the present invention, the control module may form a closed loop by a magnetization coil and a battery of the circuit breaker and the control unit, based on the received GOOSE message type control signal, and may apply a current to the magnetization coil. As the magnetization coil is operated by the current, a circuit breaking operation of the circuit breaker may be performed.

To achieve these and other advantages and in accordance with the purpose of this specification, as embodied and broadly described herein, there is provided a method for controlling a control unit for a circuit breaker, the control unit which interworks with a relay and a circuit breaker, the method comprising: receiving a GOOSE message type control signal from the relay connected thereto through Ethernet communication; checking whether the received GOOSE message type control signal is related to the control unit; and if the received GOOSE message type control signal is related to the control unit, operating the circuit breaker based on the GOOSE message type control signal.

In an embodiment of the present invention, the step of operating the circuit breaker based on the GOOSE message type control signal may include: forming a closed loop by a magnetization coil and a battery of the circuit breaker and the control unit, based on the received GOOSE message type control signal, and applying a current to the magnetization coil; and operating the magnetization coil by the current, thereby performing a circuit breaking operation of the circuit breaker.

The present invention can have the following advantages.

Firstly, usage of a contact signal line can be minimized through signal transmission/reception between an Relay and a control unit, by using GOOSE communication protocols of IEC 61850-based substation automation. This can allow a hardwire for connecting the relay to the circuit breaker, to be omitted. Accordingly, a user's convenience in installation can be enhanced, and fabrication costs can be reduced.

Secondly, a plurality of circuit breakers can be controlled by one Relay, or a specific circuit breaker can be controlled by a plurality of Relays. This can enhance operating efficiency of the entire system.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
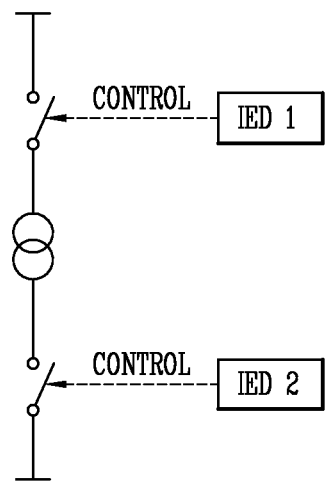
FIG. 1 is an exemplary view illustrating that a relay is installed at a circuit breaker in accordance with the conventional art.
Figure 2:
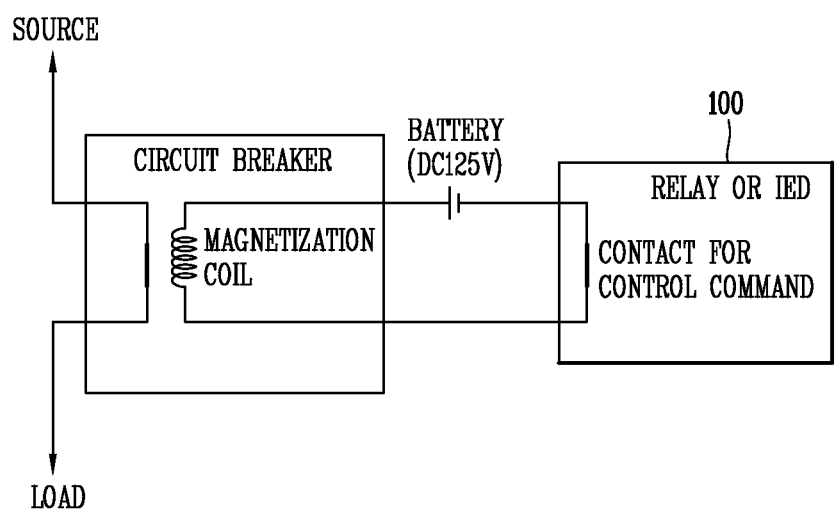
FIG. 2 is a conceptual view illustrating a connection relation between a relay and a circuit breaker in accordance with the conventional art.
Figure 3:
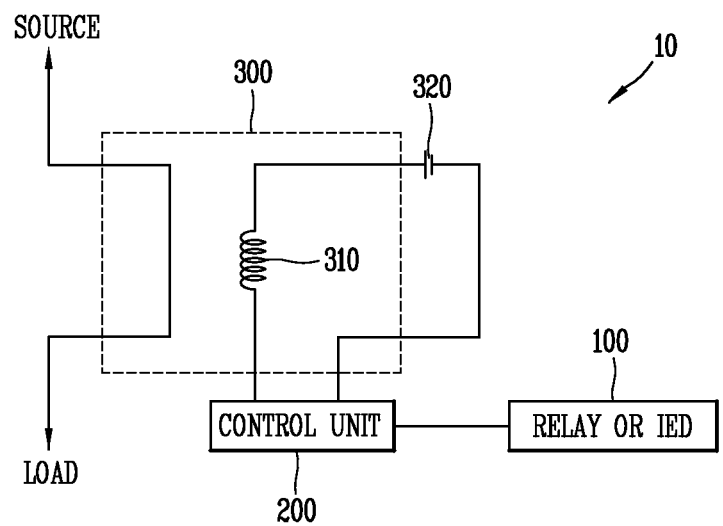
FIG. 3 is a block diagram illustrating a configuration of an entire system according to an embodiment of the present invention.

FIG. 3 is a block diagram illustrating a configuration of an entire system 10 according to an embodiment of the present invention.

As shown in FIG. 3, the entire system 10 includes an Intelligent Electronic Device (IED) or a relay 100 (hereinafter, will be referred to as a 'relay' 100), a control unit 200 and a circuit 300. However, the entire system 10 is not limited to have the components of FIG. 3. That is, the entire system 10 may have larger or smaller number of components than the components of FIG. 3.

In order to protect the system and to perform one-way control command, the relay 100 generates a control signal including a control command (or a control status) for controlling any circuit breaker to be controlled, in the form of a GOOSE message (GOOSE data), based on IEC 61850 GOOSE communication protocols. The IEC 61850 GOOSE communication protocols are international standard communication protocols for substation automation, which have been developed by applying an object-oriented theory to various types of device data, etc., inside a power system, in order to overcome data incompatibility between relays of communication protocols operated in the conventional power system such as DNP and MODBUS.

Also, the IEC 61850 GOOSE communication protocols provide an MMS for communication between a server and a client, GOOSE for communication between relays for interlock, SV protocols for waveform signals of a voltage and a current.

The relay 100 broadcasts the generated GOOSE message type control signal, to one or more control units (e.g., the control unit 200) connected thereto by Ethernet communication. The Ethernet communication may be optical (FX) communication, twisted fair (TX) communication, etc.

The relay 100 may generate a control signal of any GOOSE message form, the control signal for controlling one or more control units connected to the relay 100 by Ethernet communication.

The relay 100 may broadcast the generated control signal of any GOOSE message form through Ethernet communication.

Figure 4:
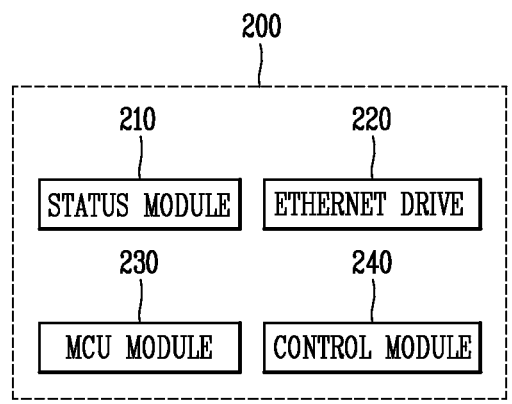
FIG. 4 is a block diagram illustrating a configuration of a control unit for a circuit breaker according to an embodiment of the present invention.

As shown in FIG. 4, the control unit 200 is composed of a status module 210, an Ethernet drive 220, a main control unit (MCU) module 230, and a control unit 240. However, the control unit 200 is not limited to have the components of FIG. 4. That is, the control unit 200 may have larger or smaller number of components than the components of FIG. 4.

The control unit 200 may be mounted in the circuit breaker 300 in the form of a module.

The control unit 200 may be installed outside the circuit breaker 300 as an independent module.

The status module 210 manages an operation status of the circuit breaker 300 connected to the control unit 200.

The Ethernet drive 220 may be implemented for Ethernet communication including optical (FX) communication, twisted fair (TX) communication, etc.

The Ethernet drive 220 receives the GOOSE message type control signal which is broadcast from the relay 100 connected thereto through the Ethernet communication. The GOOSE message type control signal includes a status of a contact point, quality information, and timestamp information as well as the control command.

Alternatively, the Ethernet drive 220 may receive any GOOSE message type control signal broadcast from one or more Relays (e.g., the relay 100) connected thereto through Ethernet communication.

The MCU module 230 checks whether the GOOSE message type control signal, received from the Ethernet drive 220, is related to the control unit 200 or not.

If the received GOOSE message type control signal is related to the control unit 200, the MCU module 230 transmits the control signal to the control module 240 so that the control module 240 can reflect a status of the control signal.

On the contrary, if the received GOOSE message type control signal is unrelated to the control unit 200, the MCU module 230 deletes (or abandons) the received GOOSE message type control signal.

The control module 240 entirely controls the control unit 200.

The control module 240 operates the circuit breaker 300 connected thereto, based on the GOOSE message type control signal received from the MCU module 230. As a result, the circuit breaker 300 performs a circuit breaking operation.

More specifically, the control module 240 forms a closed loop by a magnetization coil 310 and a battery 320 of the circuit breaker 300 and the control unit 200 (i.e., the control module 240), based on the GOOSE message type control signal received from the MCU module 230. Then the control module 240 applies a current to the magnetization coil 310. By the current applied to the magnetization coil 310, the circuit breaker 300 may perform a circuit breaking operation.

The number of the status module 210 and the control module 240 of the control unit 200 may be variable according to the number of the circuit breaker 300 to be controlled by the control unit 200.

The IEC 61850 GOOSE communication module may be implemented by the MCU module 230 or a dedicated chip (or dedicated module).

Circuitry for driving the MCU module 230 may have a different configuration according to a type of the MCU module 230.

The circuit breaker 300 determines whether to supply power to a load, or to cut off power supply to the load, under control of the control unit 200.

As shown in FIG. 3, the circuit breaker 300 includes the magnetization coil 310 and the battery 320.

In a case where a closed loop is formed by the magnetization coil 310, the battery 320 and the control unit 200 (or the control module 240) under control of the control unit 200, the magnetization coil 310 performs a circuit breaking operation of the circuit breaker 300, based on a current supplied from the battery 320.

In a case where the closed loop is formed under control of the control unit 200, the battery 320 applies a current (or power) to the magnetization coil 310.

The battery 320 applies a DC current (or DC power) to the magnetization coil 310.

As signal transmission/reception between the relay and the control unit is performed by using GOOSE communication protocols of IEC 61850-based substation automation, usage of a contact signal line can be minimized.

Further, a plurality of circuit breakers can be controlled by one Relay, or a specific circuit breaker can be controlled by a plurality of Relays.

Hereinafter, a method for controlling a control unit for a circuit breaker according to the present invention will be explained in more detail with reference to FIGS. 3 to 5.

Figure 5:
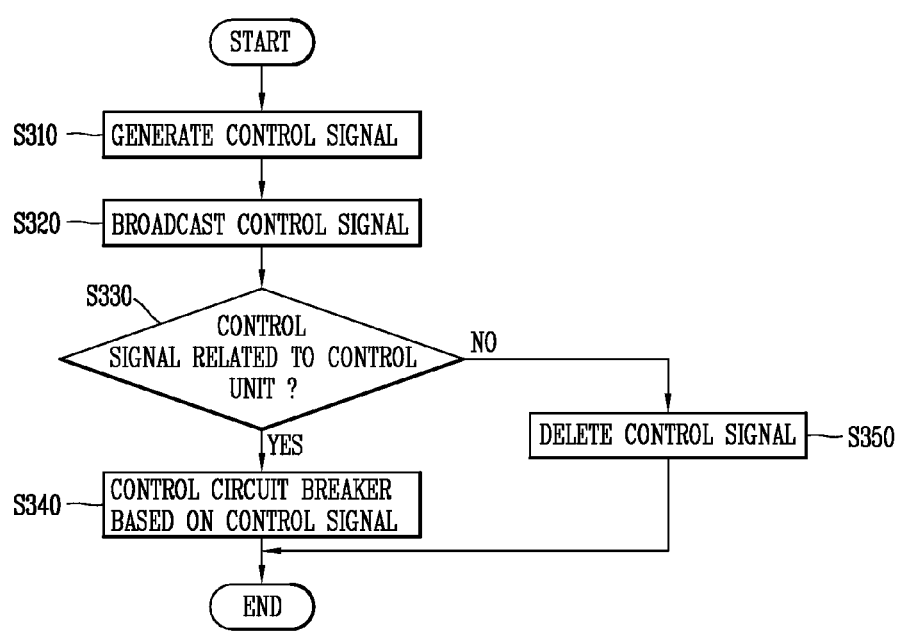
FIG. 5 is a flowchart illustrating a method for controlling a control unit for a circuit breaker according to an embodiment of the present invention.

FIG. 5 is a flowchart illustrating a method for controlling a control unit for a circuit breaker according to an embodiment of the present invention.

In order to protect the system and to perform one-way control command, a relay 100 generates a control signal including a control command (or a control status) for controlling any circuit breaker to be controlled (e.g., the circuit breaker 300), in the form of a GOOSE message (GOOSE data), based on IEC 61850 GOOSE communication protocols (S310).

Next, the relay 100 broadcasts the generated GOOSE message type control signal, to one or more control units (e.g., the control unit 200) connected thereto by Ethernet communication. The Ethernet communication may be optical (FX) communication, twisted fair (TX) communication, and so on (320).

The control unit 200 receives the GOOSE message type control signal which has been broadcast from the relay 100. The GOOSE message type control signal includes a status of a contact point, quality information and timestamp information.

The control unit 200 checks whether the received GOOSE message type control signal is related thereto or not (S330).

If the received GOOSE message type control signal is related to the control unit 200, the control unit 200 operates the circuit breaker 300 based on the received GOOSE message type control signal. As a result, a circuit breaking operation of the circuit breaker 300 is performed.

More specifically, if the received GOOSE message type control signal is related to the control unit 200, the control unit 200 forms a closed loop by a magnetization coil 310 and a battery 320 of the circuit breaker 300 and the control unit 200, based on the received GOOSE message type control signal. Then the control unit 200 applies a current to the magnetization coil 310. The magnetization coil 310 operates by the current applied thereto, and the circuit breaker 300 performs a circuit breaking operation based on the operation of the magnetization coil 310 (S340).

On the contrary, if the received GOOSE message type control signal is unrelated to the control unit 200, the control unit 200 deletes (or abandons) the received GOOSE message type control signal (S350).

The present invention can have the following advantages.

Firstly, usage of the contact signal line can be minimized through signal transmission/reception between the relay and the control unit, by using GOOSE communication protocols of IEC 61850-based substation automation. This can allow a hardwire for connecting the relay to the circuit breaker, to be removed. Accordingly, a user's convenience in installation can be enhanced, and fabrication costs can be reduced.

Secondly, a plurality of circuit breakers can be controlled by one Relay, or a specific circuit breaker can be controlled by a plurality of Relays. This can enhance operating efficiency of the entire system.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A control unit for a circuit breaker which interworks with a relay, the control unit comprising:
a status module configured to manage an operation status of the circuit breaker connected to the control unit;
an Ethernet drive configured to receive a GOOSE message type control signal from the relay via Ethernet communication;
a control module configured to operate the circuit breaker based on the GOOSE message type control signal; and
a main control unit (MCU) module configured to:
determine whether the GOOSE message type control signal is related to the control unit;
transmit the GOOSE message type control signal to the control module if the GOOSE message type control signal is related to the control unit; and
delete the GOOSE message type control signal if the received GOOSE message type control signal is unrelated to the control unit,
wherein the control unit is mounted outside of the circuit breaker as an independent module, and
wherein the relay is connected to one or more control units and the relay is configured to broadcast the GOOSE message type control signal to the one or more control units via Ethernet communication.

2. The control unit for a circuit breaker of claim 1, wherein:
the control module is configured to apply a current to a magnetization coil to form a closed loop of the magnetization coil, a battery of the circuit breaker, and the control unit based on the received GOOSE message type control signal; and a circuit breaking operation of the circuit breaker is performed by operation of the magnetization coil by the current.

3. The control unit for a circuit breaker of claim 1, wherein the GOOSE message type control signal includes a control command, a status of a contact point, quality information and timestamp information.

4. The control unit for a circuit breaker of claim 2, wherein the GOOSE message type control signal includes a control command, a status of a contact point, quality information and timestamp information.

* * * * *